United States Patent
Lurie

(10) Patent No.: US 10,146,714 B1
(45) Date of Patent: Dec. 4, 2018

(54) METHOD AND SYSTEM FOR SYNCHRONIZING TRANSACTION STREAMS OF A PARTIAL SEQUENCE OF TRANSACTIONS THROUGH MASTER-SLAVE INTERFACES

(71) Applicant: CADENCE DESIGN SYSTEMS, INC, San Jose, CA (US)

(72) Inventor: Yoav Lurie, Zichron Yaakov (IL)

(73) Assignee: Cadence Design Systems, Inc., San Jose, CA (US)

( * ) Notice: Subject to any disclaimer, the term of this patent is extended or adjusted under 35 U.S.C. 154(b) by 395 days.

(21) Appl. No.: 15/057,286

(22) Filed: Mar. 1, 2016

(51) Int. Cl.
  *G06F 11/34* (2006.01)
  *G06F 13/362* (2006.01)
  *G06F 11/30* (2006.01)
  *G06F 13/36* (2006.01)

(52) U.S. Cl.
  CPC ........ *G06F 13/362* (2013.01); *G06F 11/3027* (2013.01); *G06F 11/3409* (2013.01)

(58) Field of Classification Search
  CPC . G06F 13/362; G06F 11/3027; G06F 11/3409
  USPC ........................................ 710/110
  See application file for complete search history.

(56) References Cited

U.S. PATENT DOCUMENTS

| | | | | |
|---|---|---|---|---|
| 2006/0271715 A1* | 11/2006 | Harris | ................. | G06F 13/4027 710/110 |
| 2007/0011366 A1* | 1/2007 | Morishita | ........... | G06F 13/4213 710/36 |
| 2007/0055813 A1* | 3/2007 | Ingram | ............... | G06F 13/1642 711/100 |
| 2008/0313365 A1* | 12/2008 | Bruce | ..................... | G06F 13/36 710/38 |
| 2011/0106991 A1* | 5/2011 | Kawahito | ........... | G06F 13/4217 710/110 |
| 2012/0144079 A1* | 6/2012 | Sakaguchi | .......... | G06F 13/4059 710/110 |
| 2012/0290752 A1* | 11/2012 | Lim | ..................... | G06F 13/4022 710/110 |
| 2013/0246682 A1* | 9/2013 | Jandhyam | ........... | G06F 13/1626 710/310 |
| 2014/0006665 A1* | 1/2014 | Amano | .................. | G06F 13/362 710/116 |
| 2014/0026126 A1* | 1/2014 | Richter | ............... | G06F 11/3656 717/128 |
| 2014/0101340 A1* | 4/2014 | Jandhyam | ............. | G06F 3/0659 710/6 |

(Continued)

*Primary Examiner* — Christopher B Shin
(74) *Attorney, Agent, or Firm* — Pearl Cohen Zedek Latzer Baratz LLP

(57) ABSTRACT

A method for synchronizing transactions between components of a system on chip includes monitoring a partial sequence of transactions that use AXI communication protocol for a stream of address calls and a streams of transfer batches. For each of the address calls and transfer batches identified by the same unique identifier, extracting an anticipated an anticipated number of transfers per batch from each of the address calls of the stream of address calls, and recursively, comparing the anticipated numbers of transfers extracted from the address calls of the stream of address calls with the number of transfers in the transfer batches of the stream of batches. Pairing a predetermined number of consecutive address calls of the stream of address calls with consecutive batches of the stream of batches based on the comparison.

11 Claims, 8 Drawing Sheets

(56) References Cited

U.S. PATENT DOCUMENTS

2015/0081934 A1* 3/2015 Gupta ................... G06F 13/00
                                                    710/56
2015/0199286 A1* 7/2015 Hughes ............... G06F 13/1673
                                                    710/310

* cited by examiner

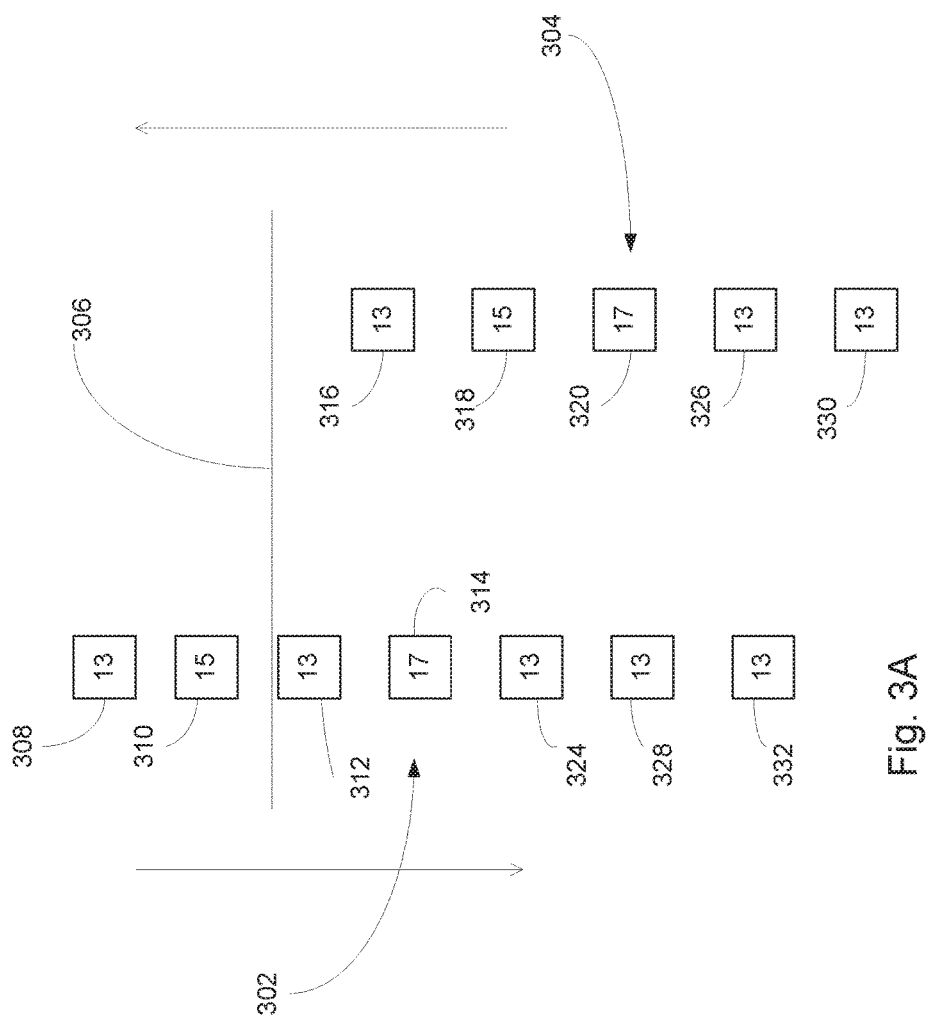

METHOD AND SYSTEM FOR SYNCHRONIZING TRANSACTION STREAMS OF A PARTIAL SEQUENCE OF TRANSACTIONS THROUGH MASTER-SLAVE INTERFACES

FIELD OF THE INVENTION

The present invention relates to monitoring transactions between components of a system on chip (SoC) for validation, testing or performance measurement purposes. More specifically, the present invention relates to method and system for synchronizing transaction streams of a partial sequence of transactions through single master-slave interfaces and through a plurality of master-slave interfaces.

BACKGROUND

Design verification is a common process for testing a newly designed integrated circuit, board, or system-level architecture, to confirm that it complies with the requirements defined by a specification of an architecture for that device. Design verification for a device under test (DUT) may be performed on the actual device, but usually a simulation model of the device is tested.

Verification of electronic designs has typically three forms. At an early stage, before the electronic design is implemented in hardware, simulation is conducted on a model of the design. Another form is emulation, in which one electronic hardware is used to mimic the behavior of another (tested) electronic hardware. At more advanced stages of design development a system on chip is validated, in a process which is typically referred to as post-silicon validation. Post-silicon validation is the last stage in the electronic design development, before it is manufactured.

Emulation is a process that involves replicating behavior of a hardware device under design using a software environment that is used by manufacturing automation control engineers to validate their programmable logic controller (PLC) files, ladder logic files and human-machine interface (HMI) files before moving to the physical plant environment.

SUMMARY

There is thus provided, according to some embodiments of the present invention, a method for synchronizing transactions between components of a system on chip. The method may include monitoring a partial sequence of transactions that use AXI communication protocol for a stream of address calls and a streams of transfer batches, passing through a master-slave interface of a master and slave of the system on chip. The method may also include for each of the address calls and transfer batches identified by the same unique identifier, extracting an anticipated number of transfers per batch from each of the address calls of the stream of address calls, and recursively, performing a comparison of the anticipated numbers of transfers extracted from the address calls of the stream of address calls with the number of transfers in the transfer batches of the stream of batches. The method may further include pairing a predetermined number of consecutive address calls of the stream of address calls with consecutive batches of the stream of batches based on the comparison.

In some embodiments of the invention, the predetermined number is a maximal number of transactions that the master or an interconnect between the master and interconnect can transfer concurrently.

According to some embodiments the address calls are address read calls, and the transfer batches are response data transfer batches.

In some embodiments the method may further include, if a consecutive address read call of the address read calls is not paired with a consecutive transfer batch of the transfer batches before the predetermined number of the consecutive address calls of the stream of address calls is paired with consecutive batches of the stream of batches based on the comparison, discarding any previously paired consecutive address calls of the consecutive address calls of the stream of address calls and consecutive batches of the stream of batches, and pairing the predetermined number of consecutive address calls of the stream of address calls with consecutive batches of the stream of batches based on the comparison.

In some embodiments, the method may also include pairing address read calls that are uniquely identified with transfer batches of the partial sequence of transactions.

According to some embodiments the address calls are address write calls, and the transfer batches have equal number of data transfers, the pairing of the address calls with the transfer batches comprising pairing address write calls of the address calls with transfer batches that are separated by a shortest total time delay.

There is also provided in accordance with some embodiments of the invention a method for monitoring concurrent transactions streams of a partial sequence of transactions through master-slave interfaces between components of a system on chip (SoC). The method may include monitoring a partial sequence of concurrent transaction streams that use AXI communication protocol, each of the transaction streams including a stream of address calls and a streams of transfer batches, passing through a master-slave interface of a master and slave of the system on chip. The method may also include synchronizing the transaction streams of the partial sequence via each of the master-slave interfaces; and upon determining that the transaction streams of the partial sequence via each of the master-slave interfaces are synchronized, synchronizing address calls streams and data transfer streams of the partial sequence via an interconnect between the components of the SoC.

In some embodiments the method may further include, after determining that the concurrent transaction streams are synchronized, analyzing the concurrent transaction streams for validation or verification of the SoC.

According to some embodiments the method may further include, upon detection of an address call of a stream of the transaction streams that has initiated in a master of the SoC and has no detected corresponding data transfer, resynchronizing that stream.

In some embodiments the method may also include discarding a burst that has initiated from a slave and has no corresponding address call corresponding to that burst.

In some embodiments the method may also include considering as legal data obtained by a snoop filter at a first access of a cache line.

According to some embodiments the method may also include considering as legal data obtained at a first access to internal cache of the interconnect.

In some embodiments determining that transaction streams via the interconnect are synchronized comprises determining that a predetermined number of the transactions has been successfully completed.

There is also provided, in accordance with some embodiments of the invention a system for synchronizing transactions between components of a system on chip. The system includes an interconnect validator configured to monitor a partial sequence of transactions that use AXI communication protocol for a stream of address calls and a streams of transfer batches, passing through a master-slave interface of a master and slave of the system on chip. The validator is further configured, for each of the address calls and transfer batches identified by the same unique identifier, extract an anticipated an anticipated number of transfers per batch from each of the address calls of the stream of address calls, and recursively, perform a comparison of the anticipated numbers of transfers extracted from the address calls of the stream of address calls with the number of transfers in the transfer batches of the stream of batches; and pair a predetermined number of consecutive address calls of the stream of address calls with consecutive batches of the stream of batches based on the comparison.

BRIEF DESCRIPTION OF THE DRAWINGS

In order to better understand the present invention, and appreciate its practical applications, the following figures are provided and referenced hereafter. It should be noted that the figures are given as examples only and in no way limit the scope of the invention. Like components are denoted by like reference numerals.

FIG. 3A illustrates communication streams (via Ar and Rr) associated with "write" commands.

DETAILED DESCRIPTION OF EMBODIMENTS OF THE INVENTION

In the following detailed description, numerous specific details are set forth in order to provide a thorough understanding of the methods and systems. However, it will be understood by those skilled in the art that the present methods and systems may be practiced without these specific details. In other instances, well-known methods, procedures, and components have not been described in detail so as not to obscure the present methods and systems.

Although the examples disclosed and discussed herein are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method examples described herein are not constrained to a particular order or sequence. Additionally, some of the described method examples or elements thereof can occur or be performed at the same point in time.

Unless specifically stated otherwise, as apparent from the following discussions, it is appreciated that throughout the specification, discussions utilizing terms such as "adding", "associating" "selecting," "evaluating," "processing," "computing," "calculating," "determining," "designating," "allocating" or the like, refer to the actions and/or processes of a computer, computer processor or computing system, or similar electronic computing device, that manipulate, execute and/or transform data represented as physical, such as electronic, quantities within the computing system's registers and/or memories into other data similarly represented as physical quantities within the computing system's memories, registers or other such information storage, transmission or display devices.

A chipset is a set of electronic components of an integrated circuit (IC) that manages data flow between various devices of the IC (e.g., processor, memory, audio device, screen and other peripherals, etc.).

Figure 1:
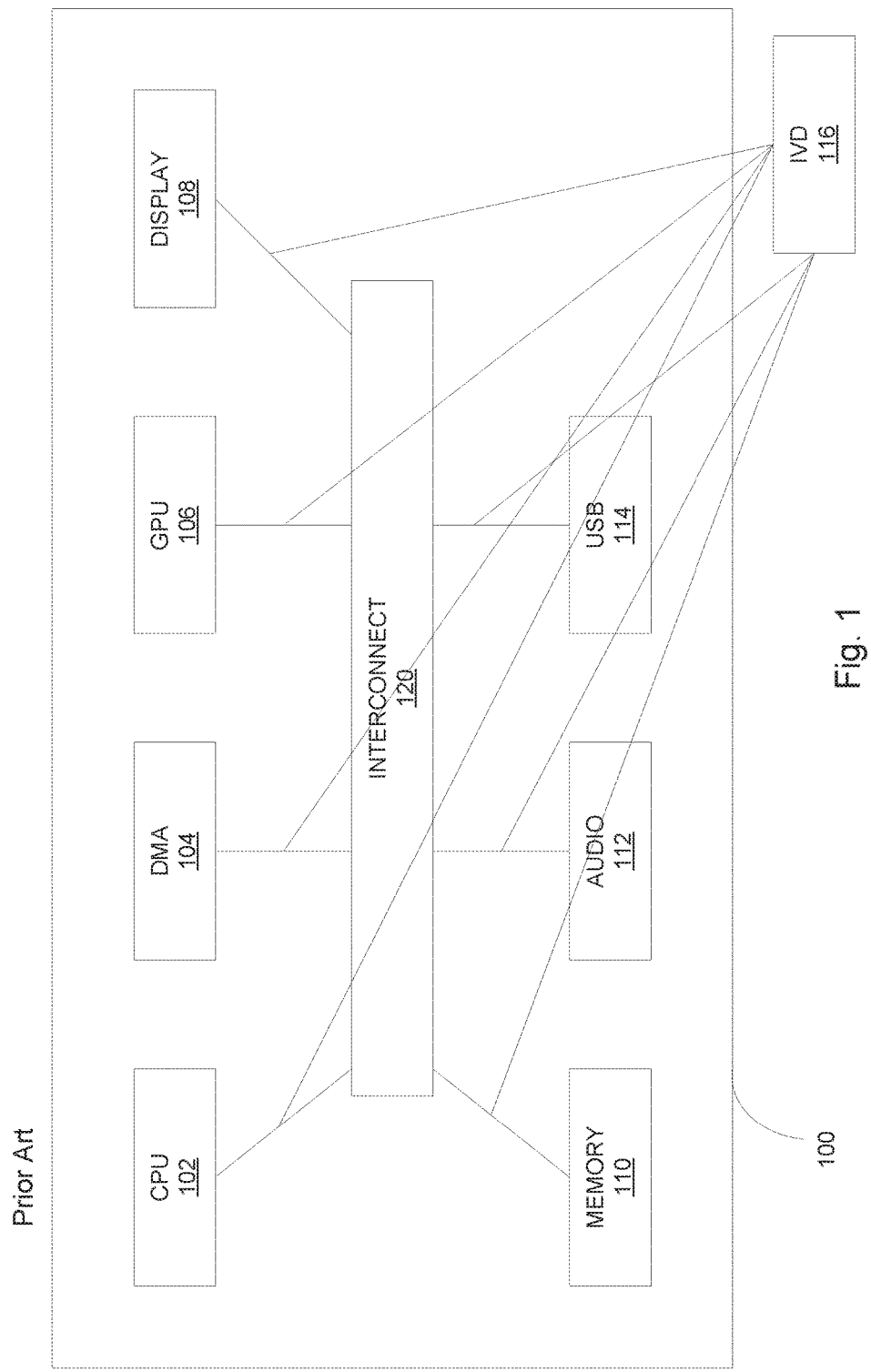
FIG. 1 illustrates a schematic design of a typical system on chip (SoC) (prior art).

FIG. 1 illustrates a schematic design of a typical system on chip (SoC) 100 (prior art). Interconnect 120, as its name suggests, is used to interconnect the various devices of the SoC—in this example, central processing unit (CPU) 102, direct memory access (DMA) 104, graphical processing unit GPU 106, display 108, memory 110, audio 112 and a universal serial bus (USB) port—USB 114. The devices in this figure are merely examples of various SoC devices, whereas the overall design of the SoC in this figure may not necessarily present any valid SoC design.

Recently, an interconnect validator (IVD) tool 116 (FIG. 1) was introduced that can track communications between IC components via the interconnect and determine whether these communications are valid (e.g., whether a certain transmission that was communicated from one device was received by another device that was the intended recipient, and whether that communication was complete, etc.). Tracking of the interconnect communications is carried out by monitoring communication channels connecting the IC components via the interconnect.

Such interconnect validator is typically designed to validate interconnect communications in simulation scenarios which exhibit typical clock cycles frequencies of a few dozens of Hertz (Hz). Given that the typical clock cycle frequency of final chips is in the order of one Gigahertz (1 GHz), a second of operations performed on a chip takes some three years to simulate on a simulator.

An emulator speeds up the test process, as it typically involves a plurality of computers, each simulating a part of the DUT, which operate at typical clock cycle rate of millions of cycles (Megahertz—MHz). Typically, processing online data obtained from tracked communications between IC components by IVD at such rates is not practical.

Thus, in order to analyze and validate interconnect communications between IC components of a chipset, the IVD 116 (or other tracking device) collects data of the tracked interconnect communications and saves it into a log file, which may be analyzed offline. The saved data in the log file relates to incoming and outgoing communications passing through the interconnect. Thus, for example, if a transmission was carried out between CPU 102 (FIG. 1) and memory 110 via interconnect 120, the logged data includes any data that was communicated between CPU 102 and interconnect 120 (to and fro) and any data that was communicated between memory 110 and interconnect 120 (to and fro).

In practice, an emulation execution run of a few seconds would typically result in a log file of some over 100 Giga bytes (Gbytes). It would take some 10 days for an IVD to fully process such file. However, when faced with a specific task of reviewing such results the user has some idea on the part or parts of the test are of interest (e.g., certain instance or instances) and what part or parts of the collected data should to be scrutinized.

According to some embodiments of the present invention, a method for analyzing communications between components of a SoC includes obtaining a continuous sequence of transactions (hereinafter—"partial sequence"), which is a part of a longer continuous sequence of transactions carried out between SoC components, and analyzing the partial sequence only.

For example, the partial sequence may be extracted from a log file of recorded transactions of a full (or a lengthier) execution of transactions (e.g., a test run of a DUT on an emulator). The partial sequence may also be obtained by recording only a portion of interest of transactions carried out between SoC components. Other methods may also apply.

There are various protocols for communications that are carried out between components of a chip. For example, ARM Holdings offers a chipset architecture for RISC processors. For example, many smartphones employ ARM chipset architecture. Advanced Microcontroller Bus Architecture (AMBA) is an open-standard, on-chip BUS specification for connection and management of functional components in SoC designs that was introduced by ARM Holdings.

There are various AMBA communication protocols, for example: Advanced Peripheral Bus (APB), Advanced High-performance Bus (AHB), Advanced Extensible Interface (AXI), Coherent Hub Interface (CHI).

Some embodiments of the present invention, described in the following description specifically relate to the AXI protocol, unless stated otherwise.

Generally, when two components of a SoC (hereinafter— "components" for brevity) communicate, one of these components initiates the communication (typically referred to as "master") and the other component responds (typically referred to as "slave"). Typically a CPU is a master. Other components categorized as "masters" include, for example, DMA, GPU. "Slave" components may include, for example, memory, audio device, display device, USB, etc. When dealing with an interconnect that handles communications between a master component (e.g., CPU, GPU, etc.) and a slave component (e.g., USB, memory, etc.) the interface of the interconnect that communicates with the master component is a slave interface, whereas the interface of the interconnect that communicates with the slave component is a master interface (see FIG. 2). The communication protocols considered (e.g., AMBA communication protocols, such as the AXI protocol) are "point-to-point" protocols.

Figure 2:
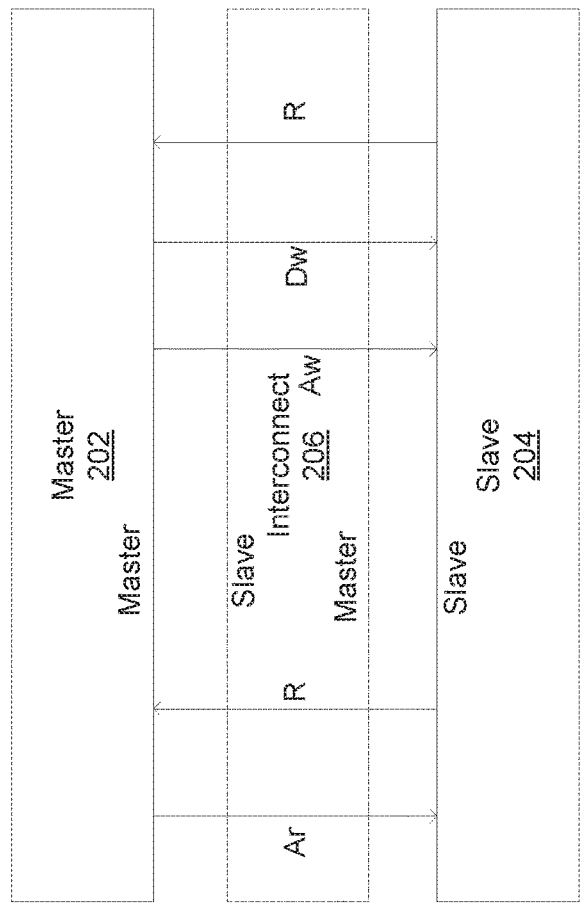
FIG. 2 illustrates "read" and "write" transactions carried out between master and slave components according to AXI protocol (prior art).

FIG. 2 illustrates "read" and "write" transactions carried out between master 202 and slave 204 components according to AXI protocol (prior art).

AXI memory mapped interface between two communicating components uses five channels of communications. A "read" transaction uses two of these channels (read address channel, Ar, and transfer response channel, Rr), whereas a "write" transaction uses another three channels (write address channel, Aw, write data channel, Dw, and write response channel, Rw).

When a "read" transaction is carried out, master 202 (e.g., CPU) initiates an address read call via the read address channel, Ar, sending (via interconnect 206) an address from which data is to be read to slave 204 (e.g., internal cache). The data located in that address is sent from slave 204 back to master 202 via the read response channel, Rr.

Typically there are many read and write transactions that are carried out concurrently, and many communications are handled simultaneously. In order to distinguish between different transactions the AXI memory mapped interface assigns distinct identity information to different transmissions. Thus, for example, if four read calls are concurrently initiated each of the four read address calls is assigned an ID (e.g. a number). For example, if there are four address read calls addressing four addresses, e.g., addresses 1, 10, 37 and 48, these calls are assigned ID numbers, e.g., 13, 15, 13, 17, respectively. Transfers bearing different ID numbers do not necessarily arrive in the same order at which the initiating calls were issued, but if the same ID number is assigned to different calls the order in which the address read calls are issued is maintained and the corresponding transfers or transfer batches are kept in that order. Thus the first response read call associated with the address read call numbered 13 corresponds to address read call that targeted address 1, and the second response numbered 13 corresponds to address read call that targeted address 37. Numbering different initiated calls with the same ID number ensures their chronological order is maintained, when such order is necessary (for example, generating a reset command followed by a read command that are assigned the same ID number ensures that the data received was extracted after the reset command was carried out). The number of anticipated data transfers in response to an address read call is in fact indicated in the address read call itself. The returned transfers are not numbered but the last transfer of a batch is flagged (hereinafter referred to as—"L").

When a "write" transaction is carried out, master 202 sends (via interconnect 206) to slave 204 an address write call via address write channel (Aw), as well as data to be written in that address via data write channel, Dw, whereas slave 204 sends a response to master 202 via the response channel, Rw. It should be noted that in the communications between master 202 and interconnect 206, interconnect 206 is considered a slave, whereas in the communications between interconnect 206 and slave 204, interconnect 206 is considered a master.

Addressing a partial sequence of a longer continuous sequence of transactions requires synchronization with respect to the ongoing transactions in order to properly analyze these transactions.

FIG. 3A illustrates communication streams (via Ar and R) associated with a "read" transaction—a stream 302 of address read calls and a corresponding stream 304 of transfers, the arrows indicating the direction of the streams.

Assuming tracking (e.g., recording starts, or partial sequence of transactions is extracted from a greater log file—hereinafter referred to as "recording" for brevity) of a long continuous sequence of transactions between SoC components (via address read channel 302 and response channel 304) begins at a certain point in time, marked by line 306) it is difficult to pair incoming transfers with outgoing calls, as previous transactions are not known. For example, after the first outgoing address read call 312 identified as "13" is detected an incoming response 316 also identified as "13" is detected. It is practically impossible to know whether response 316 is indeed the response corresponding to address read call 312, or to another address read call that was issued earlier, before recording started. The second address read call 314 identified as "17" is followed by an incoming response 318 identified as "15". Next, three consecutive address read calls 324, 328 and 332, all identified as "13" are detected with a respective detection of an incoming response 320 identified as "17" followed by two transfers 326 and 330, which are both identified as "13", and so on.

It is unclear and not simple to figure out how these calls and transfers are related.

Since it is obvious that all address read calls found immediately after the point of time when recording started should get transfers that are received later on, it is clear that there might be (in fact it is highly probable) residual response data transfers that should be neglected before synchronization between the stream of address read calls and the stream of transfers are declared synchronized.

Pairing transaction calls identified by different IDs—be it a pair of a single call and a single response, or batches of a plurality of calls and a plurality of corresponding transfers, where each batch is identified by a unique ID is rather simple. All that it takes is identifying and pairing same IDs.

In the case illustrated in FIG. 3 response 320 identified as "17" is linked to address read call 314 bearing the same ID ("17"), whereas response 318 identified as "15" is discarded in the absence of a corresponding address read call. But there are also calls and transfers identified by the same ID (calls 312, 324, 328 and 332 and transfers 316, 326 and 330).

Figure 3B:
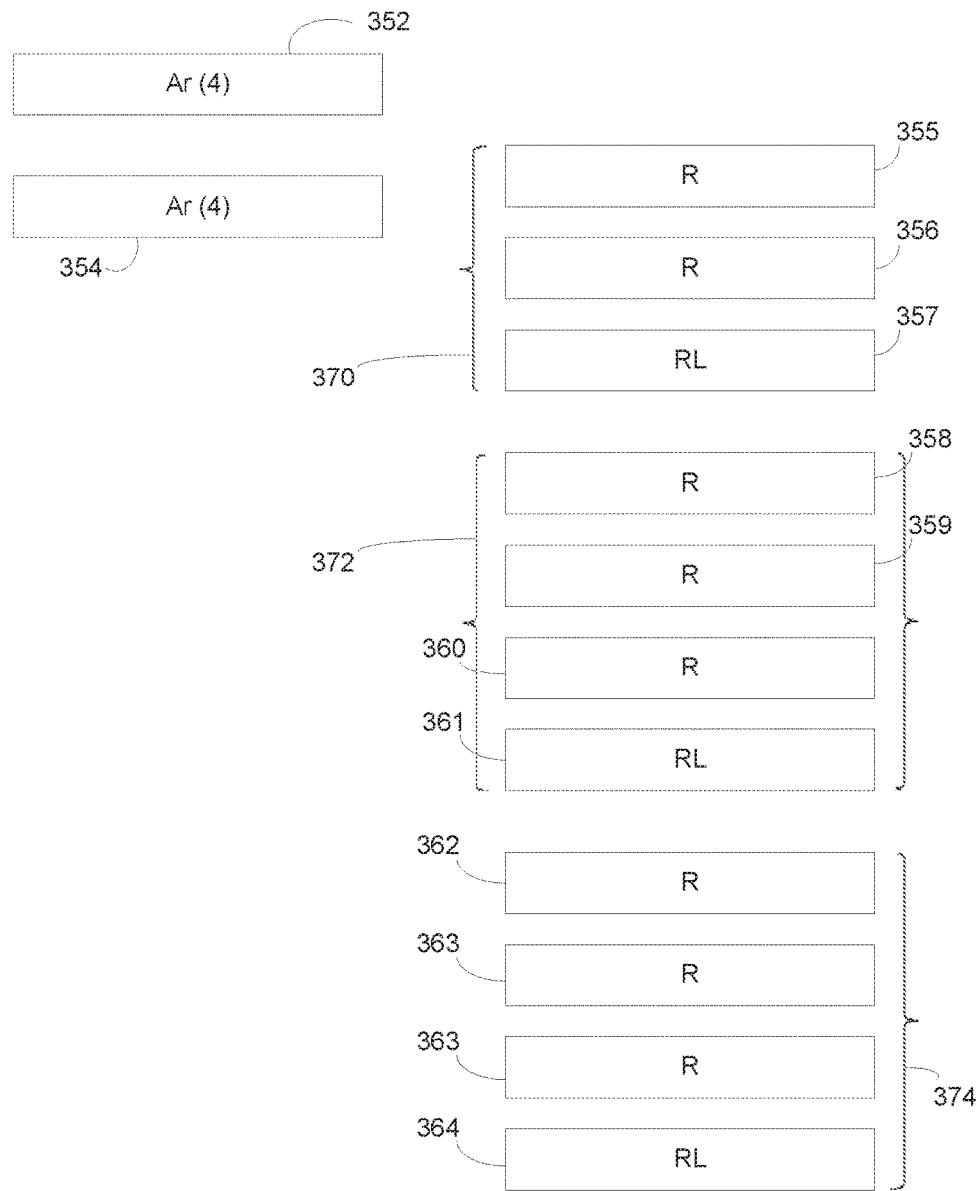
FIG. 3B illustrates an unsynchronized partial sequence of AXI "read" transactions—address read call stream and a transfer stream where only batches of data transfers (hereinafter—"transfers") bearing the same IDs are considered (uniquely identified calls and transfers are omitted), for synchronizing in accordance with some embodiments of the present invention.

FIG. 3B illustrates an unsynchronized partial sequence of AXI "read" transactions—address read call stream and a transfer stream where only batches of transfers bearing the same IDs are considered (uniquely identified calls and transfers are omitted), for synchronizing in accordance with some embodiments of the present invention.

As all calls and transfers bear the same ID their ID is not indicated in this figure.

A call that requires a batch of transfers (all assigned the same ID) typically includes an indication of the number of transfers in the return batch that are to be received. For example address read call 352 indicates that a batch of four (4) transfers are to be send in response. Response data transfers of a batch bearing the same ID number are not numbered, but the last of the batch is flagged as the last transfer of the batch (L).

Synchronization of "read" communication streams according to some embodiments of the present invention includes obtaining a recording of a partial sequence of transactions that starts at a certain point in time in which address read calls and transfers are recorded in the order of their appearance, such as in FIG. 3B.

Further, the recorded communication streams are analyzed. In the analysis the recorded communication streams are searched to pair corresponding incoming transfer batches and a first predetermined number of consecutive address calls.

When analyzing the streams in FIG. 3B it is evident that the first three transfers (355, 356 and 357 of batch 370) relate to an earlier call as the batch includes only three data transfers, and these are therefore disregarded (discarded). Then the next batch 372 is considered. Batch 372 includes four transfers, 358, 359, 360 and 361. It is easily determined that the number of data transfers in batch 372 is equal to the indicated number of transfers that are meant to be received in response to address read call 352, but that is not certain yet. So, a synchronization method according to some embodiments of the present invention considers batch 372 as a candidate for pairing with call 352, but goes on to review the next incoming batch 374 and correlate it with the next read address call 354, following the previous call 352 which is pending confirmation for being paired with batch 372.

Address read call 354 indicates that four data transfers are to be returned in a transfer batch, so when considering the next incoming batch seem to match this.

If the following call corresponds to the batch of transfers that follows the batch of transfers that pairs with the previous call, than the process continues.

If a batch of transfers is found not to pair with the corresponding next address read call, then the entire set of previous batches is disqualified and discarded and the process of pairing the incoming batches of transfers with the address read calls starts with the first calls.

The process is carried out until a predetermined number of consecutive calls and transfer batches are paired without any intervening mismatches. At that point the address read stream and the stream of transfer batches are determined to be synchronized. After synchronization is established the partial sequence of transactions may be analyzed to validate communications between the SoC components.

Figure 4:
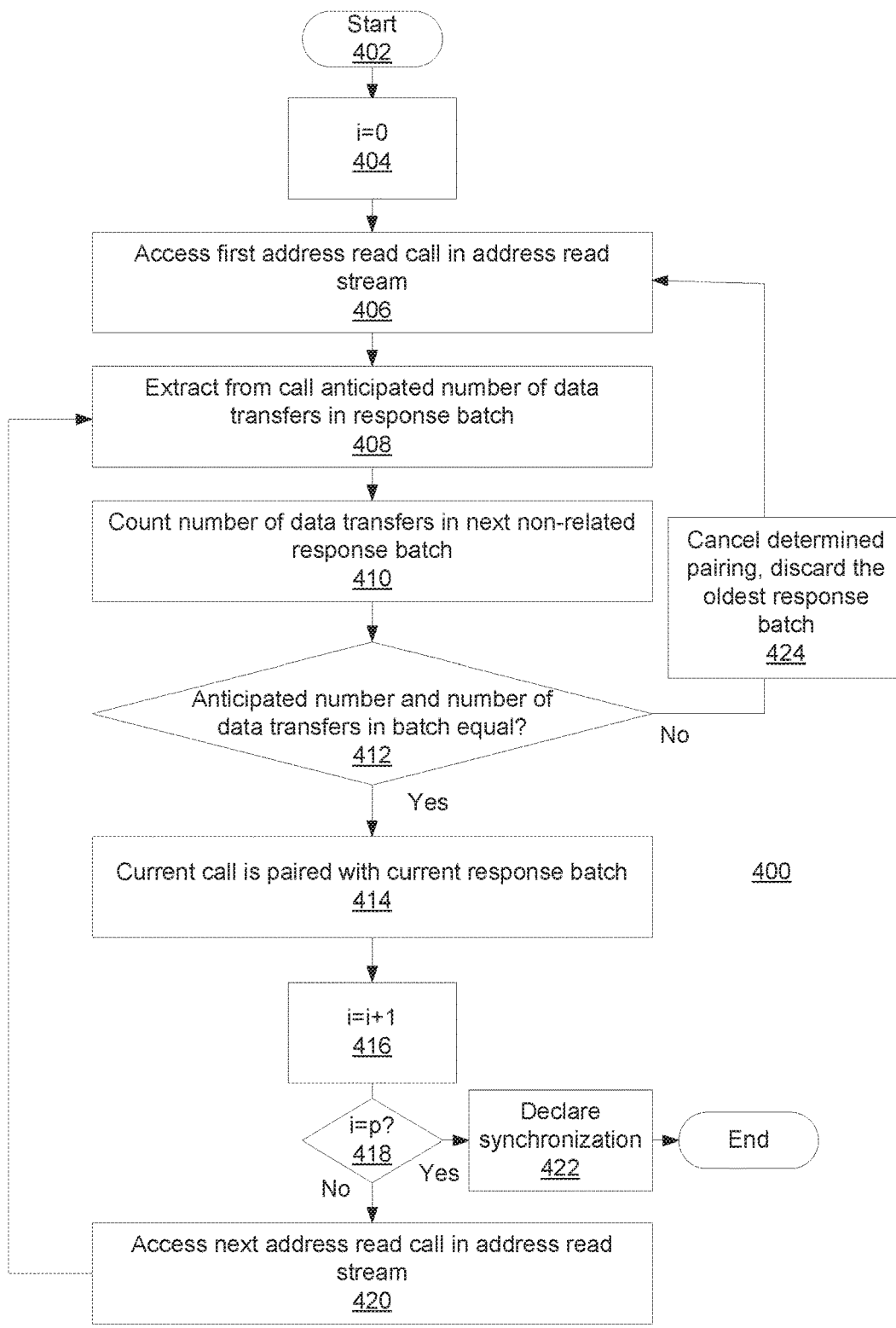
FIG. 4. Illustrates a flowchart of a method for synchronizing "read" calls and transfers all bearing the same ID, in compliance with AXI protocol, according to some embodiments of the present invention.

A flowchart of a method for synchronizing "read" calls and transfers all bearing the same ID, in compliance with AXI protocol, in a recorded partial sequence of read transactions, according to some embodiments of the present invention is illustrated in FIG. 4. Method 400 starts 402 by assigning 404 variable "i" with the integer value "0". Variable "i" serves as a counter for counting the number of paired address calls and their corresponding transfer batches. Method 400 then continues by accessing 406 the first address read call in the recorded partial sequence of read transactions, and extracting 408 from that call the anticipated number of data transfers that are to be included in the transfer batch expected to be returned. The number of data transfers in the next non-related transfer batch is counted 410 and compared with the anticipated number to determine whether they are equal 412. If they are equal, than the current call is determined to be paired 414 with the current transfer batch. Counter "i" is increased by 1, 416, and compared 418 with a value "p" which is a number representing the predetermined number of paired calls and transfer batches needed to declare the call stream and the response stream synchronized. If "i" is determined to be equal to "p" then synchronization is declared 422 and the process ends. Typically, p is greater than "1", so the next address read call is accessed 420 and the process goes to obtain 406 from the new (current) call the anticipated number of data transfers in the expected transfer batch. The next non-related transfer batch is considered and the number of data transfers in that batch are counted 410. If the counted data transfers pairs 412 with the anticipated number this pair of call and transfer batch are determined to be related as well, and the process moves on to check the next call and transfer batch, repeating the process until the predetermined number of consecutive calls and transfer batches are determined to be related, at which time the process ends by declaring the call stream and the transfer batch stream synchronized. The synchronization of the two streams means that the following calls and transfer batches are all expected to be paired and be accounted for. The greater the value of "p", the greater the chances that synchronization is indeed valid. It is possible to know the maximal number of transactions that the master or the interconnect can transfer concurrently, in some embodiments of the invention "p" can be equal. If there is a problem the synchronization process for "p" that is greater than the number of transactions the master can send through the interconnect, then it should not be counted as a synchronization problem but it is likely a bug in the tracked system.

If however the number of data transfers in the next transfer batch does not pair with the anticipated number of the current call, than the declared pairs are canceled the oldest (first) transfer batch is discarded 424, and the process of pairing transfer batch for the first call in the partial sequence of transactions starts again with the next (second) transfer batch. If a mismatch is found during the repeated process, the oldest transfer batch is again discarded, the declared relations canceled and the process for pairing the next transfer batch (now the third batch) with the first call starts again. This process is repeated until the predetermined number ("p") of bursts (calls and their paired transfer batches) is consecutively paired, at which point the synchronization of the streams is declared.

In the process of synchronizing the address and transfer stream of a partial sequence of "read" transactions, according to some embodiments of the present invention if pairing is failed, transfer batch or batches are always discarded in their order of appearance (chronological order). In other words, in the synchronizing process the address read call stream of the partial sequence is left intact, and the process is directed at finding the correct pairing of the address read call stream with the data transfer stream by only moving forward data transfer batches while keeping their relative (chronological) order until complete pairing is determined.

The synchronization methods described hereinabove, with respect to a partial sequence of read transactions, according to some embodiments of the present invention, which relates to a single master-interface, may not be able to handle a situation where the number of data transfers in a batch in a lengthy stream of transfer batches is constant over a lengthy period of time. A solution for that situation is possible when considering a plurality of master-slave interfaces in the monitored SoC, as will be explained later.

A "write" transaction under AXI protocol is carried out in an orderly manner, as follows. An address write call which is assigned an ID is sent with the address at which the following data is to be written to. Next the data packet or transfers containing the data that is to be written at the address indicated by the previous address write call are transmitted. In AXI3 (version of AXI) the one or more data transfers were marked by the ID of the address write call that they relate to. In AXI4 the data transfers are not identified, and instead are sent in an order corresponding to the order of "write" calls.

Figure 5:
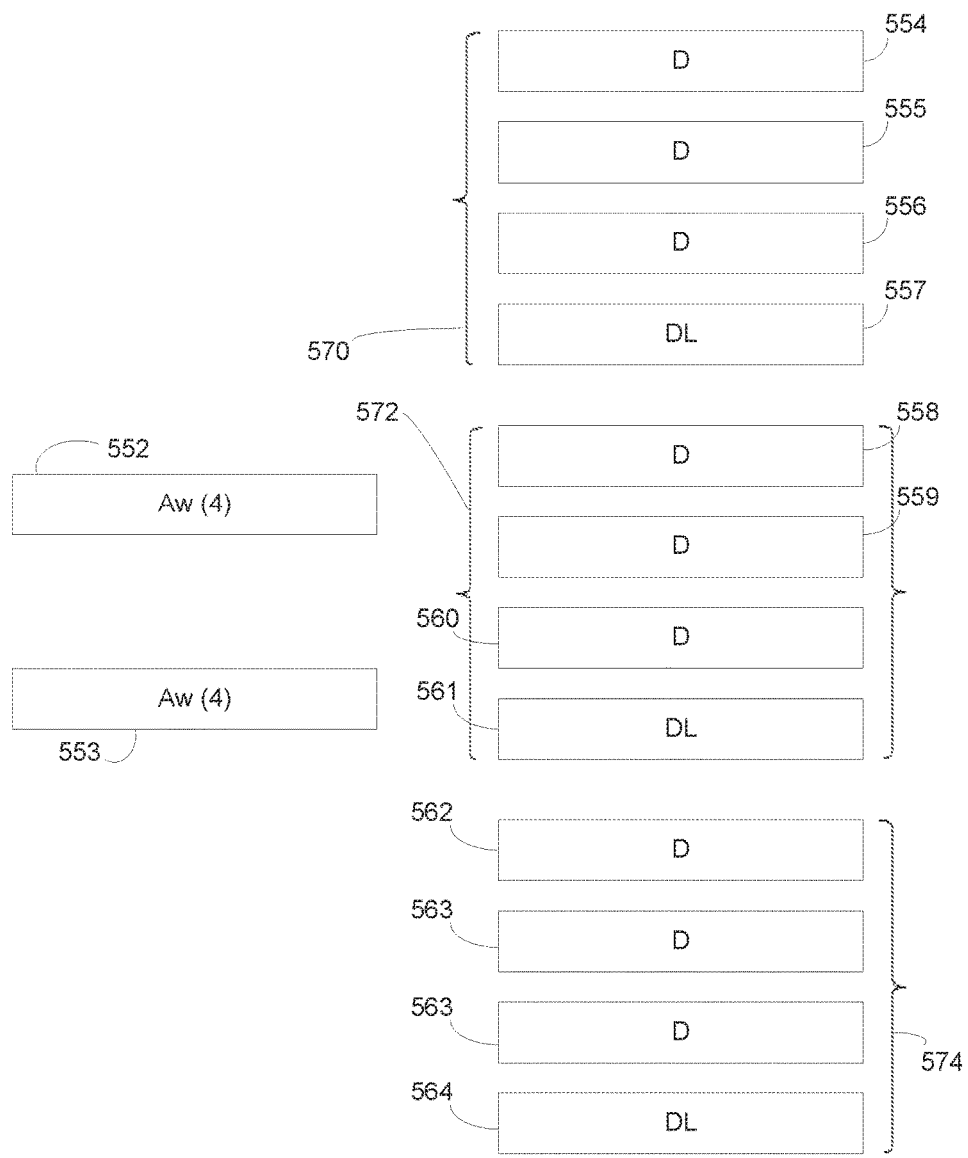
FIG. 5 illustrates an unsynchronized partial sequence of AXI "write" transactions—address write call stream and a transfer stream where only batches of data transfers, containing the same number of transfers and bearing the same IDs are considered, for synchronizing in accordance with some embodiments of the present invention.

FIG. 5 illustrates an unsynchronized partial sequence of AXI "write" transactions—address write call stream and a transfer stream where only batches of data transfers, all containing the same number of transfers and bearing the same IDs, are considered, for synchronizing in accordance with some embodiments of the present invention. The figure relates in particular to AXI4.

Typically, an address write call is followed by a corresponding data transfer. If the call relates to a batch of transfers, then an address write call is followed by a corresponding data transfer batch. The number of transfers in the corresponding batch are indicated in the address write call (in the figure the number of transfers in a batch is presented in parentheses). However, there may be situations where, at a sampling point located somewhere between the master and the slave, due to one or a few reasons (e.g., congestion in the communication traffic), data transfers reach that point through the data channel before the address write call that corresponds to these data transfers has reached that point via the address write channel. Such situation is typically referred to as "data before address" (DBA).

Thus, when examining the partial sequence of transactions illustrated in FIG. 5, it may not be clear whether transfer batch 570 that includes four data (D) transfers, 554, 555, 556 and 557 (the latter flagged as last—DL), corresponds to a previous address write call that was issued at a point of time in the past before the beginning of the partial sequence, or to address write call 554 that was sampled later in time, after the last transfer 557 of that transfer batch (570) was sampled (DBA), or perhaps it relates to the later address write call 553. Same considerations may be raised with respect to the other transfer batches of the partial sequence—batch 572 (that includes transfers 558, 559, 560 and 561) and batch 574 (that includes transfers 562, 563, 564 and 565).

According to some embodiments of the present invention, a heuristic approach is applied. A total delay period (TDP) is defined which is the sum of time differences between the sampling time of a candidate address call and the sampling time of each of the transfers of a transfer batch. In order to find and pair address write calls and their respective corresponding transfer batches the partial sequence is analyzed by pairing address write calls of the partial sequence with transfer batches that are closest in time to these calls—that is, separated by the shortest cumulative time intervals (TDP). In the process, an address write call that appears at the beginning of the partial sequence (in other words, a call that is included in the recorded partial sequence) is to be discarded because another call is closer in time to a nearby (in terms of time) transfer batch.

At any time, if a mismatch is detected between an address call (read or write) and what was previously determined to be its paired transfer batch, repairing of the streams of calls and transfer batches is performed.

In the process of synchronizing the address and transfer stream of a partial sequence of "write" transactions, according to some embodiments of the present invention if pairing fails, transfer batch or batches as well as address write call or calls may be discarded. In the process of finding the correct pairing of the address write call stream with the data transfer stream, both the address write call stream of the partial sequence and the transfer batch stream may be affected by discarding of a call or a batch. Furthermore, the relative position of the streams may be changed in both directions—forward or backward, when synchronizing "write" transactions, as opposed to the only possible shift between the address read call stream and the transfer batches stream when synchronizing "read" transactions.

Figure 6:
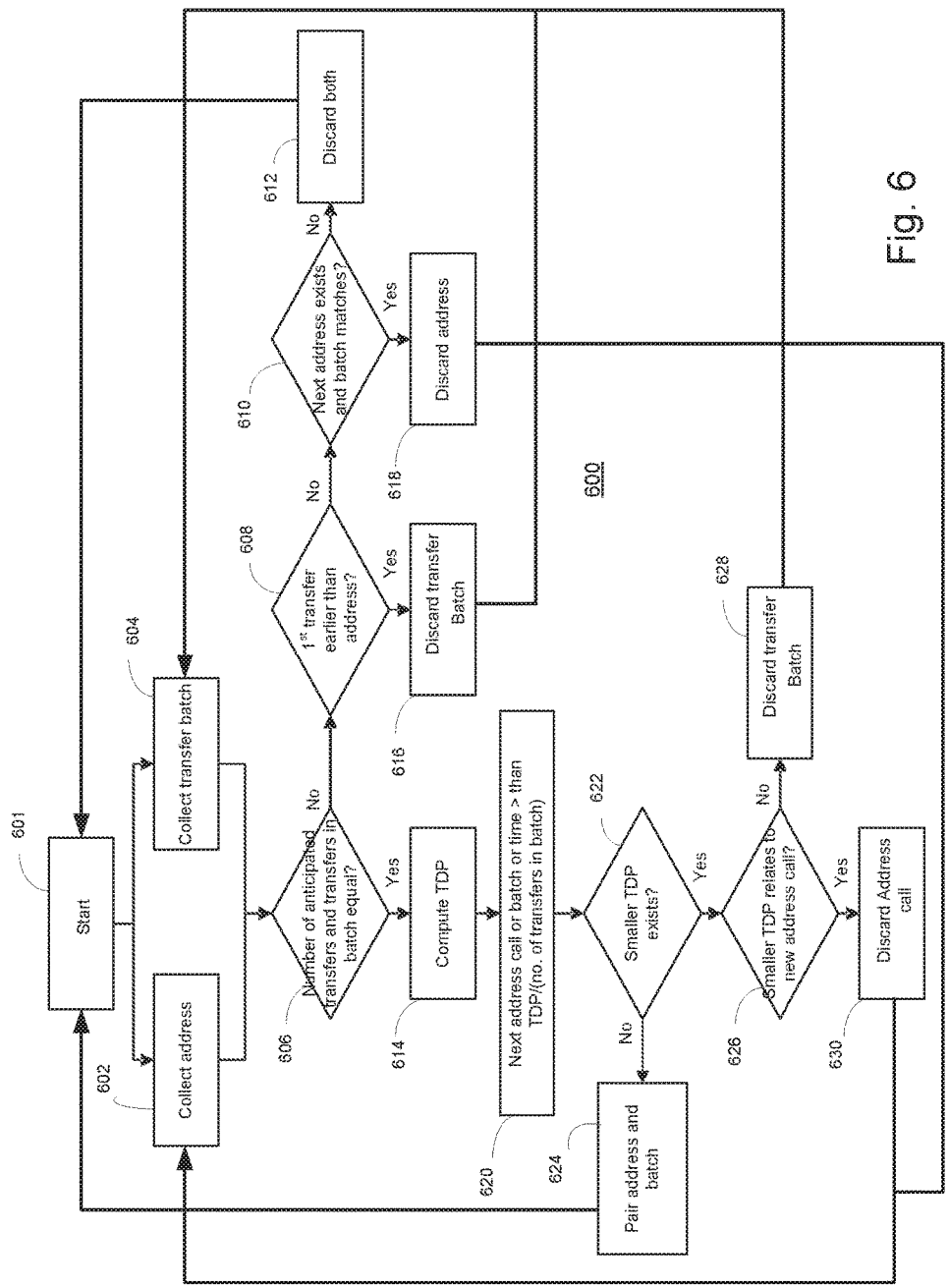
FIG. 6. Illustrates a flowchart of a method for synchronizing "write" calls and transfers all bearing the same ID, in compliance with AXI protocol, according to some embodiments of the present invention.

FIG. 6. Illustrates a flowchart of a method for synchronizing "write" calls and transfers all bearing the same ID, in compliance with AXI protocol, according to some embodiments of the present invention. Method 600 starts 601 with collecting the first address call 602 and the transfer batch 604, as these may come in different times (a call may be sampled before during or after sampling of the batch transfers). The call and batch are compared to determine 606 whether the number of transfers required by the call is equal to the number of transfers in the batch.

If the number of transfers in the batch and the number of transfers indicated by the address call are not equal, then it is determined whether 608 the first transfer is earlier in time than the address call. If the first transfer is earlier in time than the address call then the batch is discarded 616 and the next batch is collected. If there is no earlier transfer then the address call, then it is determined whether 610 there exists a next (consecutive) address call. If such next address call exits 618 then the current address call is discarded and the next address call is collected. If such next address call does not exist then the current address call and the current batch are both discarded 612 and the next address call and batch are considered.

If it is determined 606 that the number of transfers in the batch and the number of transfers indicated by the address call are the same, then TDP is computed 614. Then the tool waits for the next address call or transfer batch or in their absence for a period of time that is greater than TDP divided by the number of transfers in the current batch, whichever occurs first. New TDP is calculated 622 for next address call and current batch, or next batch and present address call. If the new TDP (for next address call and current batch, or next batch and present address call) is not smaller than the previously calculated TDP then the current address call and current batch are declared as paired 624, and the next address call and batch are collected. If the new TDP is smaller than the previously calculated TDP then it is determined 626 whether it relates to a new address call. If the new TDP does relate to a new address call then the current address call is discarded 630 and the process goes on to consider the next address call. If the new TDP does not relate to a new address call then the current transfer batch is discarded 628 and the process goes on to consider the next transfer batch.

During the process, consecutive pairing of an address call and a transfer batch are counted and the count accumulated until a predetermined number of pairs is counted, at which time the streams of address calls and corresponding transfer batches are declared as synchronized. If at any time a pairing fails (address call or batch or both are discarded) the count is reset to zero and starts over.

Synchronizing partial sequences of "read" and "write" transactions performed according to other AMBA protocols is much simpler and straight forward.

The synchronization process discussed hereinabove relates to synchronization of a single master-slave interface within the SoC. In some embodiments of the present invention only one master-slave interface is tracked and monitored and the bursts through that interface synchronized before analyzing the communications in that interface. In some other embodiments two or more master-slave interfaces are tracked and monitored and the synchronization method described herein is employed for each of these interfaces before the communication through these interfaces are analyzed.

For example, a plurality of master-slave interfaces between components of SoC (e.g., such as the SoC shown in FIG. 1) may be monitored, in order to analyze transactions between the components (e.g., in verification, validation or other kinds of testing or monitoring).

According to some embodiments of the present invention, a method of synchronizing the entire transaction streams is provided. Such method may be needed to allow tracking of multiple transactions passing through an interconnect (120, FIG. 1).

A tracking device, such as, for example, IVD 116 may be used to sample at sampling points on communication lines (a communication line typically includes a plurality of channels, such as read or write channels) between the SoC components.

When handling a partial sequence of transactions covering a plurality of communication, master-slave interface synchronization has, first, to be established for each of the communication lines of the SoC, and then, full synchronization of transaction communications between all of the components of the SoC is established.

Synchronization of single master-slave interfaces was discussed hereinabove.

Next, full synchronization of communications between all of the monitored components of the SoC is performed, in accordance with some embodiments of the invention.

A synchronization method for partial sequence of transactions carried out on an entire Soc according to some embodiments of the invention may be based on some pre-assumptions: first, when commencing synchronization of an entire SoC is must be assumed (and determined) that each of the single master-slave interfaces in that SoC is synchronized. Another assumption that stems from the understanding that synchronizing of each of the master-slave interfaces takes time, is that when attending to synchronize the entire SoC, the handled scenario is no longer an extreme scenario, or, in other words, the transactions considered at that point are not located at the very beginning of the partial sequence, but rather are found further along the sequence. Furthermore, it may be assumed that typically there will be versatile transaction communication rather than homogeneous (e.g., there will be no abundance of consecutive transactions which all target the same address).

Figure 7:
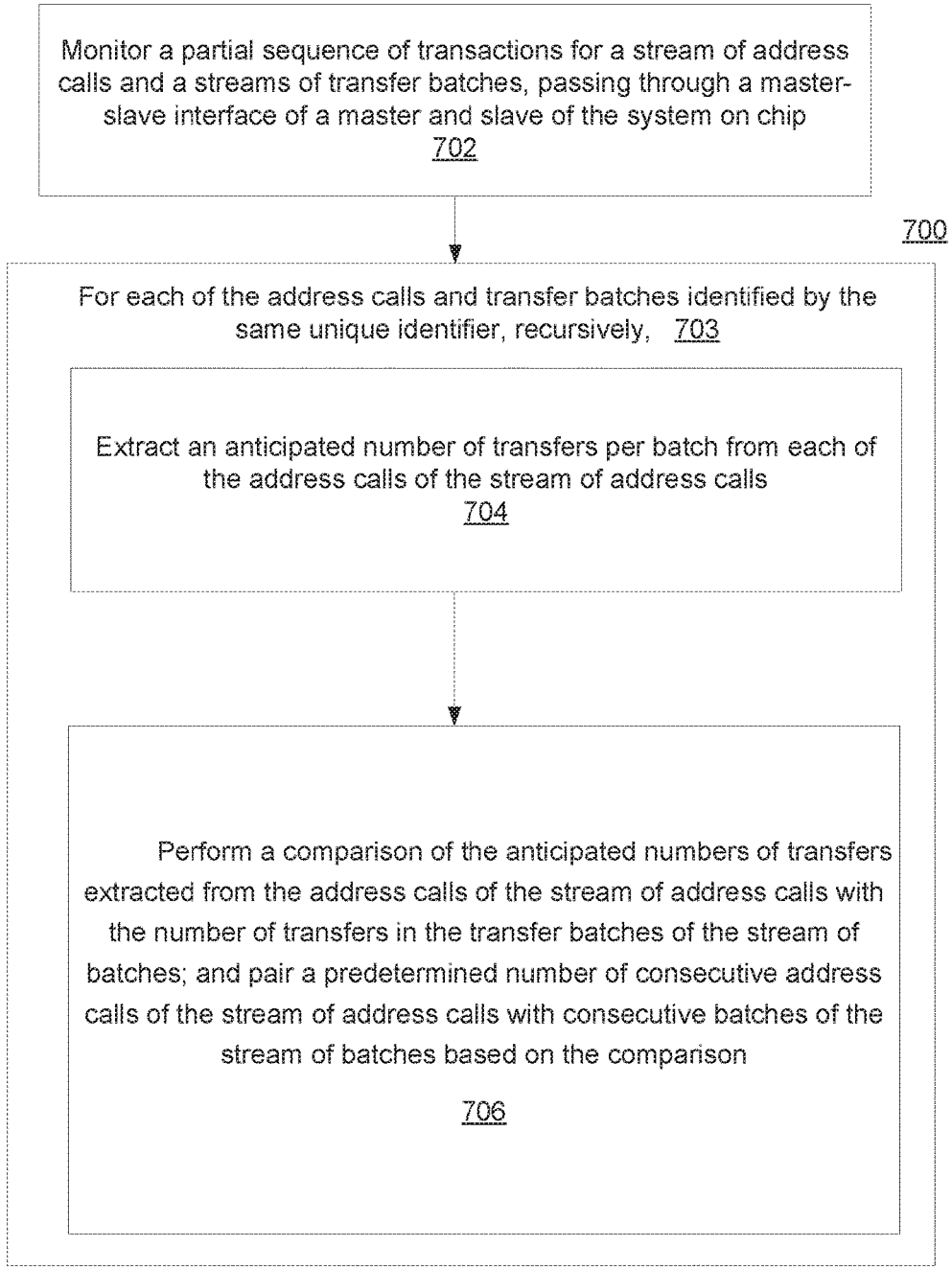
FIG. 7 illustrates a method for synchronizing a partial sequence of transactions between components of an SoC, according to some embodiments of the invention.

FIG. 7 illustrates a method 700 for monitoring transactions streams of a partial sequence of transaction through master-slave interfaces between components of a system on chip (SoC), in accordance with some embodiments of the present invention.

Method 700 may include monitoring 702 a partial sequence of transactions that use AXI communication protocol for a stream of address calls and a streams of transfer batches, passing through a master-slave interface of a master and slave of the system on chip. Method 700 may further include, for each of the address calls and transfer batches identified by the same unique identifier, recursively 703, extracting 704 an anticipated number of transfers per batch from each of the address calls of the stream of address calls. Method 700 may further include performing 706 a comparison of the anticipated numbers of transfers extracted from the address calls of the stream of address calls with the number of transfers in the transfer batches of the stream of batches; and pairing a predetermined number of consecutive address calls of the stream of address calls with consecutive batches of the stream of batches based on the comparison.

Some embodiments of the present invention may be embodied in the form of a system, a method or a computer program product. Similarly, some embodiments may be embodied as hardware, software or a combination of both. Some embodiments may be embodied as a computer program product saved on one or more non-transitory computer readable medium (or media) in the form of computer readable program code embodied thereon. Such non-transitory computer readable medium may include instructions that when executed cause a processor to execute method steps in accordance with examples. In some examples the instructions stores on the computer readable medium may be in the form of an installed application and in the form of an installation package.

Such instructions may be, for example, loaded by one or more processors and get executed.

For example, the computer readable medium may be a non-transitory computer readable storage medium. A non-transitory computer readable storage medium may be, for example, an electronic, optical, magnetic, electromagnetic, infrared, or semiconductor system, apparatus, or device, or any combination thereof.

Computer program code may be written in any suitable programming language. The program code may execute on a single computer system, or on a plurality of computer systems.

Some embodiments are described hereinabove with reference to flowcharts and/or block diagrams depicting methods, systems and computer program products according to various embodiments.

Features of various embodiments discussed herein may be used with other embodiments discussed herein. The foregoing description of the embodiments has been presented for the purposes of illustration and description. It is not intended to be exhaustive or limiting to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes that fall within the true spirit of the present invention.

The invention claimed is:

1. A method for synchronizing transactions between components of a system on chip, the method comprising:
monitoring a partial sequence of transactions that use AXI communication protocol for a stream of address calls and a stream of transfer batches that pass through a master-slave interface of a master and slave of the system on chip, each of the address calls and transfer batches being identified by an identifier, each transfer batch sending one or more transfers of data in response to a previous address call having an identifier that is identical to the identifier of that transfer batch;
recursively, for each of the address calls and transfer batches in the partial sequence that are identified by identical identifiers, and until a predetermined number of consecutive address calls of the stream of address calls in the partial sequence are paired with consecutive transfer batches stream of transfer batches of the partial sequence:
extracting from each of the address calls of the stream of address calls an anticipated number of transfers in a transfer batch to be sent in response to that address call;
comparing the anticipated number of transfers extracted from each of the address calls of the stream of address calls with a number of transfers in each of the transfer batches of the stream of transfer batches; and
when the anticipated number of transfers extracted from an address call of the stream of address calls is equal to the number of transfers in a transfer batch of the stream of transfer batches, pairing that address call with that transfer batch.

2. The method of claim 1, wherein the predetermined number is a maximal number of transactions that the master or an interconnect between the master and interconnect can transfer concurrently.

3. The method of claim 1, wherein the address calls are address read calls, and the transfer batches are response data transfer batches.

4. The method of claim 3, further comprising:
if a consecutive address read call of the address read calls is not paired with a consecutive transfer batch of the transfer batches before the predetermined number of the consecutive address calls of the stream of address calls is paired with consecutive batches of the stream of batches, discarding any previously paired consecutive address calls of the consecutive address calls of the stream of address calls and consecutive batches of the stream of batches.

5. The method of claim 1, wherein the address calls are address write calls, and the transfer batches have equal numbers of data transfers, the pairing of the address calls with the transfer batches comprising pairing address write calls of the address calls with transfer batches that are separated by a shortest total time delay.

6. A system for synchronizing transactions between components of a system on chip, the system comprising an interconnect validator configured to:
monitor a partial sequence of transactions that use AXI communication protocol for a stream of address calls and a stream of transfer batches that pass through a master-slave interface of a master and slave of the system on chip, each of the address calls and transfer batches being identified by an identifier, each transfer batch sending one or more transfers of data in response to a previous address call having an identifier that is identical to the identifier of that transfer batch,
recursively, for each of the address calls and transfer batches in the partial sequence that are identified by identical identifiers, and until a predetermined number of consecutive address calls of the stream of address calls in the partial sequence are paired with consecutive transfer batches stream of transfer batches of the partial sequence;
extract from each of the address calls of the stream of address calls an anticipated number of transfers in a transfer batch to be sent in response to that address call;
compare the anticipated number of transfers extracted from each of the address calls of the stream of address calls with a number of transfers in each of the transfer batches of the stream of transfer batches; and
when the anticipated number of transfers extracted from an address call of the stream of address calls is equal to the number of transfers in a transfer batch of the stream of transfer batches, pair that address call with that transfer batch.

7. The system of claim 6, wherein the predetermined number is a maximal number of transactions that the master or an interconnect between the master and interconnect can transfer concurrently.

8. The system of claim 6, wherein the address calls are address read calls, and the transfer batches are response data transfer batches.

9. The system of claim 8, wherein the validator is further configured to:
if a consecutive address read call of the address read calls is not paired with a consecutive transfer batch of the transfer batches before the predetermined number of the consecutive address calls of the stream of address calls is paired with consecutive batches of the stream of batches, discard any previously paired consecutive address calls of the consecutive address calls of the stream of address calls and consecutive batches of the stream of batches.

10. The system of claim 9, wherein the validator is further configured to pair address read calls with transfer batches of the partial sequence of transactions.

11. The system of claim 6, wherein the address calls are address write calls, and the transfer batches have equal numbers of data transfers, and wherein the validator is configured to perform the pairing of the address calls with the transfer batches by pairing address write calls of the address calls with transfer batches that are separated by a shortest total time delay.

* * * * *